United States Patent

[11] 3,583,329

| [72] | Inventor | Charles E. Jacoby<br>Bethlehem, Pa. |
|---|---|---|
| [21] | Appl. No | 835,926 |
| [22] | Filed | June 24, 1969 |
| [45] | Patented | June 8, 1971 |
| [73] | Assignee | SI Handling Systems Inc.<br>Eqston, Pa. |

[54] TOW TRUCK SELECTOR PIN
8 Claims, 5 Drawing Figs.

| [52] | U.S. Cl. | 104/170, 104/88 |
|---|---|---|
| [51] | Int. Cl. | B61l 13/02, B61l 13/04 |
| [50] | Field of Search | 104/88, 170, 172; 273/84 |

[56] References Cited
UNITED STATES PATENTS

| 1,165,216 | 12/1915 | Weflin | 273/84 |
|---|---|---|---|
| 2,816,516 | 12/1957 | Diehl | 104/172X |
| 3,373,698 | 3/1968 | Bishop | 104/88 |

*Primary Examiner*—Arthur L. LaPoint
*Assistant Examiner*—Robert W. Saffer
*Attorney*—Seidel, Gonda and Goldhammer ABSTRACT: The selector pin for a tow truck is disclosed as being made from a core of a material such as fiberglass coated with a casing of a polymeric plastic material. The polymeric plastic material has a low modulus of elasticity while the core has a high modulus of elasticity, thereby producing a selector pin which is flexible and can withstand great deformation in bending without permanent set.

PATENTED JUN 8 1971
3,583,329
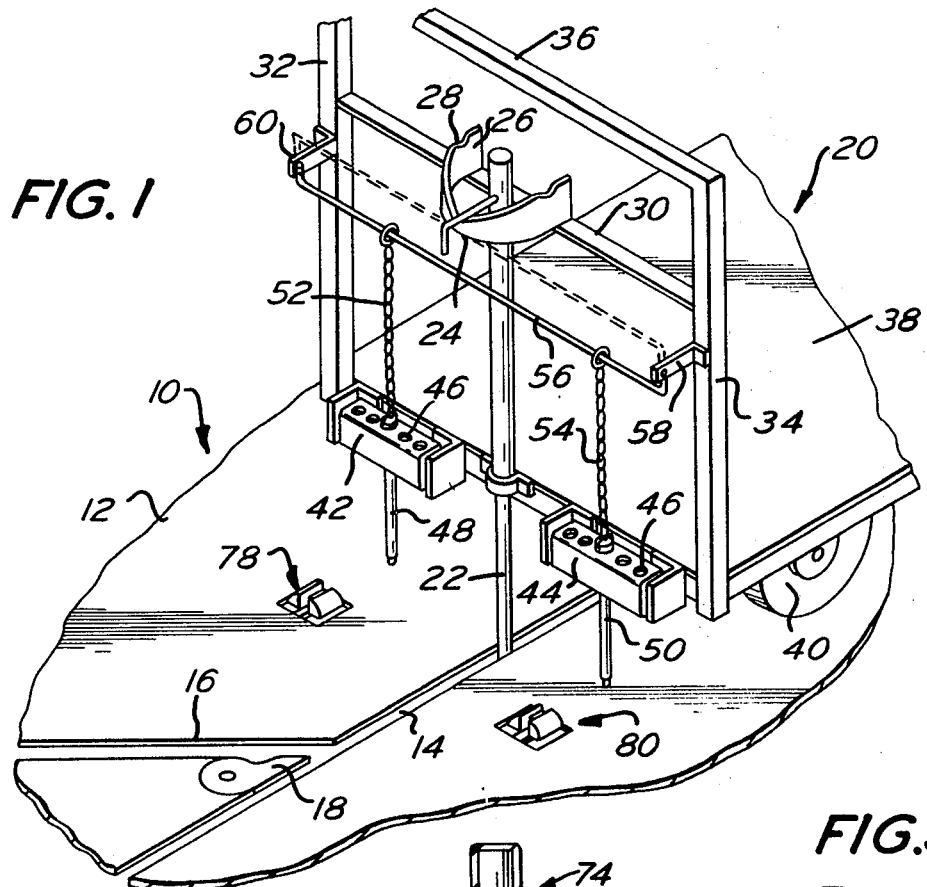
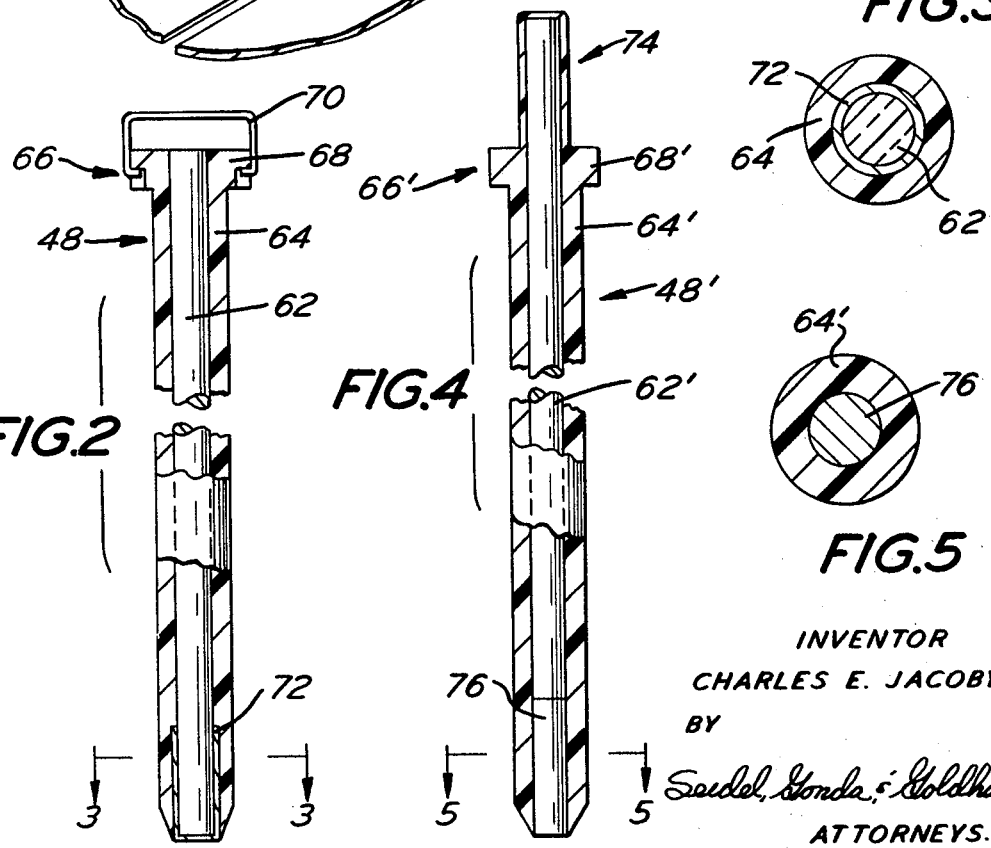
INVENTOR
CHARLES E. JACOBY
BY
Seidel, Gonda, & Goldhammer
ATTORNEYS.

TOW TRUCK SELECTOR PIN

This invention relates to selector pins of a type adapted to be used on tow trucks. Typical examples of two trucks having selector pins are shown, for example, in U.S. Pat. Nos. 3,103,183; 3,103,895; and 3,262,397. The selector pin is frequently called a trip rod. Heretofore, the selector pins have generally been made from metal such as round cold rolled low carbon steel. In some installations using such selector pins, as many as 200 selector pins may be bent during a 24 hour period of operation.

The phenomenon of having selector pins bent during operation and replaced frequently is one which the industry has lived with. The selector pins are bent during operation through a wide variety of circumstances. Most installations are put in locations wherein the system is incorporated in a concrete floor. Acceptable tolerance in the building industry for concrete floors is a tolerance of one-fourth inch. The selector pins have their lowermost ends spaced from the floor by one-fourth to three-fourths of an inch. Hence, any unevenness in the floor will cause contact between the floor and the pin thereby bending the pin. Due to skew of the vehicle, selector pins are caused to make contact with a guardrail or bump on the floor which likewise bends the selector pin.

In accordance with the present invention, the selector pin is made from two different materials having substantially different modulus of elasticity. The outer casing of the pin is made from a material having a high modulus of elasticity such as fiberglass. The outer casing for the core is made from a polymeric plastic material having a low modulus of elasticity such as polyurethane, rubber or nylon. Thus, the core of fiberglass may have a modulus of elasticity of approximately $4.7 \times 10^6$ while the outer casing of polyurethane has modulus of elasticity of approximately $1.1 \times 10^3$.

The thusly structurally interrelated selector pin will be flexible and can withstand great deformation in bending without permanent set. When the pin is bent, deformation of the polyurethane casing at the shear plane is at a minimum and the same as the deformation at the outer periphery of the fiberglass core. Since the polyurethane casing has a lower modulus of elasticity, it can withstand great deformation without permanent set. Thus, the selector pin having the desired cross-sectional area can have the required stiffness and still withstand deformation.

In accordance with one embodiment of the present invention, the selector pin may be utilized for mechanically initiating a switching action. In accordance with another embodiment of the present invention, the selector pin may be utilized for magnetically initiating a switching action. Each of the embodiments is constructed in the same or similar manner with the same or similar external configuration so that they may be utilized interchangeably. Each of the selector pins is provided with a handle portion to facilitate manipulation of the same.

It is an object of the present invention to provide a novel tow truck selector pin.

It is another object of the present invention to provide a novel tow truck selector pin having the desirable attributes of strength and flexibility while having a built-in memory.

It is another object of the present invention to provide a novel selector which may be utilized alternatively in electrical- or mechanical-switching systems for tow trucks.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a partial perspective view of a tow truck system wherein the tow truck incorporates the novel selector pin of the present invention.

FIG. 2 is a partial sectional view of one embodiment of the selector pin of the present invention.

FIG. 3 is a sectional view taken along the line 3-3 in FIG. 2.

FIG. 4 is a partial sectional view of a selector pin in accordance with another embodiment of the present invention.

FIG. 5 is a sectional view taken along the line 5-5 in FIG. 4.

Referring to the drawing in detail, wherein like numerals indicate like elements, there is shown in FIG. 1 a tow truck system designated generally as 10. The system 10 includes a floor 12 having a main slot 14 intersected at spaced points therealong by shunt slots such as shunt slot 16. Movement from along main slot 14 to movement along shunt 16 is controlled by a selectively operable diverter 18.

A vehicle or two truck 20 is mounted for movement along the main slot 14. When the selector pins are in the proper location, the truck 20 may be diverted from movement along the main slot 14 to movement along the shunt slot 16. Tow truck 20 is guided for movement along the main slot 14 by means of a tow pin 22.

The tow pin 22 extends downwardly through the slot 14. The upper end of the tow pin 22 is provided with a handle 24. Handle 24 is supported by a cam 26. Cam 26 has a central notch which supports the handle 24 when the tow pin has its lowermost end extending through the slot 14 as illustrated. Cam 26 has at least one upper notch 28. When the handle 24 is supported by notch 28, the tow pin 22 will have its lowermost end above floor level.

Cam 26 is supported by bridgework at the front end of the truck 20. Such bridgework includes a crossbar 30 supported at its ends by uprights 32 and 34. A rail 36 extends across the upper end of the uprights 32 and 34. Vehicle 20 includes a platform 38 supported on wheels 40.

At the front end of the truck 20, there is provided first and second selector pin support members 42 and 44. These support members are on opposite sides of the tow pin 22. Each of the members 42 and 44 are identical. Hence, only member 42 will be described in detail.

Support member 42 may be channel-shaped in cross section. Aligned holes 46 are provided in each of the horizontal legs of member 42 at spaced points therealong. A selector pin 48 extends through one pair of aligned holes 46 on member 42. A comparable selector pin 50 extends through the comparable pair of holes 46 on member 44. Pins 48 and 50 are identical.

The upper end of pin 48 is attached to one end of a chain 52. The upper end of pin 50 is attached to one end of a chain 54. The other end of chains 52 and 54 is attached to a ring which is slidable along a bar 56. Bar 56 has its ends pivotably supported by brackets 58 and 60. Hence, when it is desired to simultaneously move the selector pins 48 and 50 so that the same may be raised from the operative position shown to an inoperative position, the bar 56 is rotated to the phantom position shown in FIG. 1.

The selector pin 48 includes a fiberglass core 62 bonded to a casing 64 of a polymeric plastic material having a modulus of elasticity substantially lower than the modulus of elasticity for fiberglass. The preferred material for casing 64 is polyurethane. If desired, casing 64 may be made from rubber or nylon.

Selector pin 48 is provided with a handle means 66. Handle means 66 includes an enlarged diameter portion 68 having a bale 70 connected thereto. Bale 70 facilitates connecting the selector pin 48 to the chain 52.

The lowermost end of the fiberglass core 62 extends into a cup-shaped metal casing 72. Casing 72 prevents the lowermost end of the fiberglass core 62 from damage due to contact with metal actuators for the diverter 18. It will be noted that the casing 64 tapers radially inwardly to the lowermost end of the metal casing 72, as shown more clearly at the lower end of FIG. 2.

The selector pin 48 is preferably manufactured by using the core 62 having its metal casing 72 attached thereto by a force fit and using the same as a core pin in a mold. The casing 64 is poured into the mold and solidifies around the core 62 being intimately bonded therewith at the shear plane. The fiberglass core 62 provides for strength and a built-in memory while the casing 64 provided for flexibility. Hence, the tendency of selector pins to be bent during operation is minimized.

In FIGS. 4 and 5, there is illustrated another embodiment of a selector pin designated generally as 48'. Selector pin 48' is identical with selector pin 48 except as will be made clearly hereinafter. Hence, corresponding elements are provided with corresponding primed numerals.

The handle means 66' includes an enlarged diameter portion 68' and an extension 74 extending therebeyond. Extension 74 provides a convenient surface for grasping and manipulating the selector pin 48'. If desired, a hole may be drilled through the extension 74 for attaching the same to a chain. Each of the enlarged diameter portions 68 and 68' are greater than the diameter of the holes 46 whereas the diameter of the casings 64 and 64' are slightly smaller than the diameter of the holes 46.

The selector pin 48' is designed for use in tow truck systems wherein the movement of the diverter 18 from a position blocking the shunt slot to a position blocking the main slot and vice versa is initiated by a magnet which activates an electromagnetic circuit. The magnet 76 is coaxially disposed with respect to the core 62'. The casing 64' is bonded to the outer peripheral surface of the magnet 76. Magnet 76 prevents the core 62' from being exposed and subject to damage.

Actuator units 78 and 80 are provided in the floor 12. Units 78 and 80 are adapted to actuate the diverter 18 in response to simultaneous contact with the selector pins 48 and 50. The units 78 and 80 and the manner in which they activate the diverter 18 may be as set forth in U.S. Pat. No. 3,261,300.

The present invention may be embodied in other specific forms without departing from the spirit or essential attributes thereof.

I claim:

1. A selector pin for use with a tow truck system comprising a core of vitreous material enveloped by a casing of a polymeric plastic material, and handle means connected to one end thereof to facilitate supporting the encased core in an upright position.

2. A selector pin in accordance with claim 1 wherein said handle means includes a wire bale.

3. A selector pin in accordance with claim 1 wherein said handle means includes a projection extending axially of the core.

4. A selector pin in accordance with claim 1 including a metal casing surrounding the lowermost end of the core to protect the same.

5. A selector pin in accordance with claim 1 including a magnet within the casing at the other end thereof and supported thereby.

6. A selector pin in accordance with claim 1 wherein said core is fiberglass.

7. A selector pin in accordance with claim 1 wherein said core has a modulus of elasticity of approximately $4.7 \times 10^6$, and said casing having a modulus of elasticity of approximately $1.1 \times 10^3$.

8. A tow truck having a series of openings at the front end thereof, a selector pin comprising a core of vitreous material enveloped by a casing of a polymeric plastic material, said selector pin extending through one of said openings and being disposed in an upright position, handle means connected to the upper end of said pin and cooperating with structure on said truck to prevent said pin from falling through the opening, said pin being of uniform diameter for a major portion of its length, and the lowermost end of said pin being tapered from the outer periphery of the casing to the inner periphery of the casing.